March 22, 1927.

W. H. EMOND

CLOSED VEHICLE

Filed July 2, 1925

1,622,098

Inventor:
William H. Emond.
By Emery, Booth, Janney & Varney
Attys

Patented Mar. 22, 1927.

1,622,098

UNITED STATES PATENT OFFICE.

WILLIAM H. EMOND, OF SYRACUSE, NEW YORK.

CLOSED VEHICLE.

Application filed July 2, 1925. Serial No. 41,076.

This invention relates to vehicles, more particularly automotive vehicles, and the object is to provide a vehicle body of the closed type wherein the driver's seat is within a glazed enclosure which will provide an unobstructed vision for the driver.

In the conventional closed automobile body the top is supported by corner posts against which fits the wind-shield frame in front and adjacent to which lie the pillars of the forward doors. These parts collectively present a considerable obstruction to the vision of the driver and may completely blot out from the view a vehicle or a pedestrian and for this reason they constitute a well recognized source of danger. In some constructions the bulkiness of these parts has been less than in others but the disadvantages have merely been somewhat reduced in degree.

In accordance with the present invention the size of these parts is not merely reduced but the construction is essentially changed in kind by the provision of a suitable construction whereby a corner assembly is provided having a maximum dimension not substantially greater than the interpupillary distance between the eyes. By this arrangement, as will appear more clearly hereafter, essentially no obstruction whatever is presented to the clear vision of objects at whatever distance. As an example of my invention I herein show one practical construction whereby the desired results may be realized.

In the accompanying drawings:

Figs. 3 and 4 are diagrams to be referred to.

Figure 1:
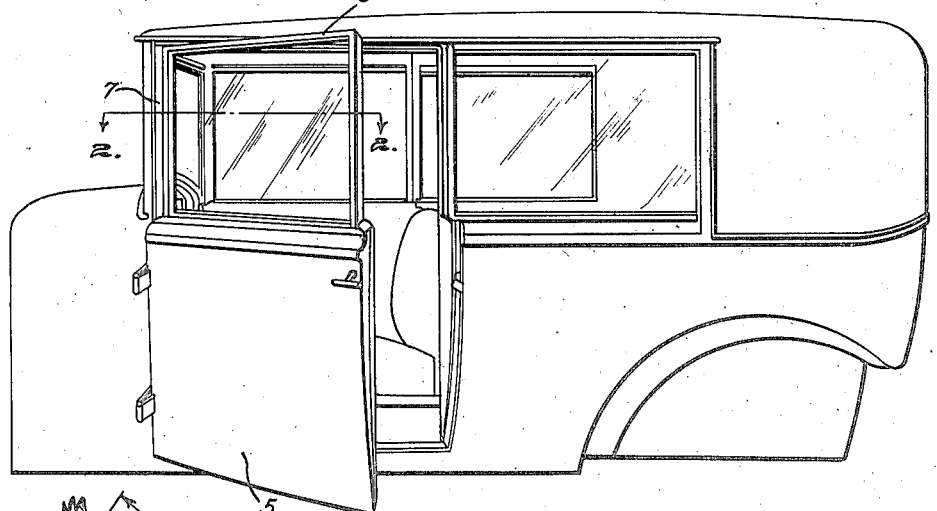
Fig. 1 is a side elevation of a vehicle body of the closed type with the forward door ajar.
Figure 2:
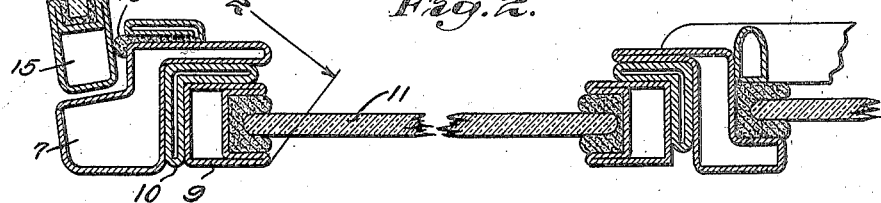
Fig. 2 is an enlarged section on the line 2—2 of Fig. 1 showing the door closed.

Referring to Fig. 1 of the drawings, I have there shown a vehicle having a lower body provided with a forward door having a door jamb adjacent the cowl. Cooperating with this jamb (being hinged thereto in the example illustrated) is a lower door section 5 extending to the belt line of the body and which may be of any suitable or convenient construction, conveniently of the so-called composite construction and consisting of a wooden frame and metal panels. Rising from the cowl adjacent the jamb and, if desirable, as a continuation thereof, is a fixed corner post 7 supporting the top, which post is preferably constructed as shown in Fig. 2 of steel tubing. As shown in Fig. 1, this post may be offset rearwardly to overhang somewhat the lower door section 5. Instead of continuing the door pillar from the belt line to the top I preferably utilize the construction shown wherein a light metallic window frame 9 is carried by the door section 5 and permanently projects between the sides and between the inner and outer faces of the door, the usual sliding glazing 11 being mounted in this frame 9. It will be understood that the glazing in its lowered position is berthed in the lower door body 5 from which it is raised to slide into the frame 7. The forward upright of this frame, of much smaller size than the customary door pillar, being, as seen in Fig. 1, of greatly reduced thickness as compared with the thickness of the door body from which it rises and of slight width fore and aft, being essentially a guide for the edge of the glazing with some small additional width to provide for its structural incorporation in the door, may close against the offset post 7 as illustrated in Fig. 2 and preferably the latter is rabbeted to receive the same as shown. In Fig. 2 a suitable packing or bumper strip 10 is shown. The construction of this door is more fully described and claimed in my Patent No. 1,592,657; July 13, 1926. A wind-shield 13 or forward glazing is provided which may be received in the frame 15, seating against a packing 16 carried by the post 7 and conveniently received in a rabbet in the post, as illustrated in Fig. 2. The two rabbets shown define an inwardly extending transverse web stiffening the post transversely of the vehicle and providing a back support for the edges of the windshield, from which web projects a flange stiffening the post in the fore and aft direction and against which the door frame closes, the edge of the windshield and the frame lying in closely spaced relation at opposite sides of said web.

The construction illustrated is an example of a practical construction which permits the corner assembly, herein consisting of the post 7, the frame 9 and the frame 15, which in the normal construction obstructs the driver's vision, to be organized within a circle having a diameter not substantially greater, conveniently somewhat less, than the interpupillary distance between the eyes. To permit convenient numerical illustrations we may for the purposes of the present description assume this distance to be 2½ inches, a convenient approximate figure, and that dimension is marked on Fig. 2. An obstruction of no greater width than this transversely, that is, transversely to the direction of sight, provides results radically different from any of greater dimensions, as will be more fully apparent from the following discussion.

Figure 3:
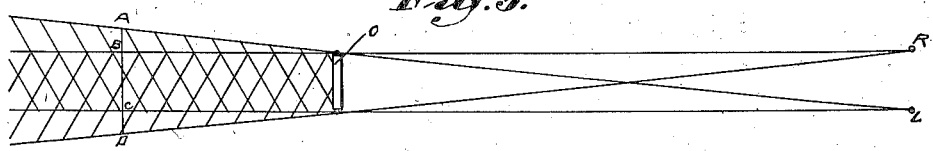
Figure 4:
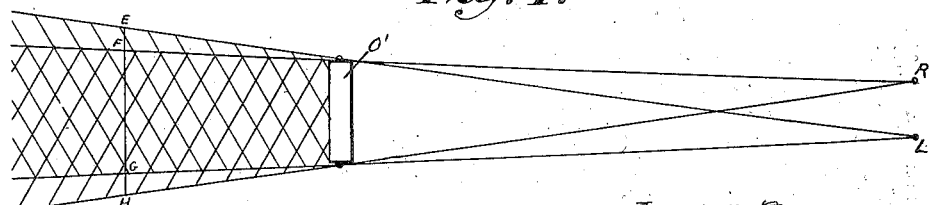

In Fig. 3 I have illustrated diagrammatically the position of the eyes R and L and an obstruction O of the same width as the distance between the eyes. This obstruction intercepts in the field of vision of the right eye R the area hatched with lines sloping downwardly from right to left and subtended by the line B—D. In the field of vision of the left eye L is intercepted the area hatched with the lines sloping downwardly from left to right and subtended by the line A—C. The vision of both eyes is obstructed in the area subtended by the line B—C and since the lines B—R and C—L are parallel, this zone or area can have no greater width than the width between the eyes at whatever distance forward (to the left in the figure) from the obstruction O. In Fig. 4 is similarly illustrated an obstruction O' of greater width than the distance between the eyes. The right eye R cannot see the area subtended by the line F—H, nor the left eye the area subtended by the line E—G, and the area which can be seen by neither eye is subtended by the line F—G. However, the lines F—R and G—L diverge and the area which cannot be seen increases in width as the obstruction O' is receded from. Thus, if an obstruction is 2 feet in front of the eyes, a common distance for the nearer corner post in a closed vehicle, and the obstruction O' is 5¼ inches across, a common present day dimension, it will blot out entirely from the vision at a point 100 feet in front of the vehicle an area of about 11 feet in width. For a vehicle going at the moderate speed of twenty miles an hour the distance of 100 feet will be traversed in a little more than three seconds. On the other hand, in the construction shown in Fig. 2 only 2½ inches of the field of vision is obstructed and this is entirely negligible, being insufficient to hide any object. For further illustration I have herein tabulated the transverse width of the field of vision obstructed at different distances away from the corner post by an assembly 2½ inches across, as herein described, by one 5¼ inches, a common present day construction, and, for an intermediate case, by one 4 inches across. The figures given, unless otherwise indicated, are in inches.

|        | 2½ | 4     | 5¼     |
|--------|----|-------|--------|
| 10 ft  | 2½ | 11½   | 18     |
| 20 ft  | 2½ | 19    | 32¼    |
| 50 ft  | 2½ | 41¼   | 74     |
| 100 ft | 2½ | 79    | 142¾   |
| 150 ft | 2½ | 116½  | 211½   |
| 100 yds| 2½ | 229   | 417¾   |

The width of 2½ inches obstructed by the corner post, which is a dimension which does not vary whatever the distance looked at, is so small in itself as to be negligible. In fact, the eyes do not see such a small stripe cut out from a distant object and focusing beyond the obstruction soon accustom themselves to the corner post in the field of vision which appears transparent or is entirely ignored. For practical purposes of vision it is as if non-existent. Practical demonstration has shown that objects at some distance, such as a motor car, are seen completely as are also objects near at hand. Thus, every number of a registration plate on a nearby car can be read with facility although it is directly in line with the corner post.

If the corner assembly is made, as has been suggested above, somewhat less in width than the normal distance between the eyes the area obstructed to the vision of both eyes obviously will be bounded by converging lines instead of diverging lines, as in the case where the obstruction is greater in width than that distance as illustrated in Fig. 4, or parallel lines, as in the case where the obstruction is equal in width to that distance as illustrated in Fig. 3, and will taper to nothing at a relatively short distance forward of the corner. In other words, the fields of vision of the two eyes at opposite sides of the obstruction converge to meet or merge in advance of the same.

I have described in detail one suitable construction whereby the advantages obtained by my invention may be practically realized and constituting, as I am now advised, the best mode of applying the principle. It will be understood, however, that the invention is not limited to any particular mechanical arrangement of parts, the principles thereof, which I claim as new and which I desire to secure by Letters Patent, being inherent in constructions coming within the scope of the appended claims.

Claims:

1. A vehicle of the closed type having top-supporting corner posts, a windshield fitting against said posts, a door having an upper portion comprising a window having an upright receiving the edge of a sliding glazing also fitting against one of said posts, the post and adjacent contacting portions of the window and the windshield together having a maximum opaque area which in transverse dimension is not greater than the normal interpupillary distance between the eyes.

2. A vehicle of the closed type having top-supporting corner posts, a windshield fitting against said posts, a door having an upper portion comprising a window frame also fitting against one of said posts, the post and the adjacent portions of the windshield and the window frame which fit against said post together having a maximum opaque area which in transverse dimension is not greater than the normal interpupillary distance between the eyes.

3. A vehicle of the closed type having an enclosed driver's seat, the enclosure including a glazed front and sides forward of said seat including top-supporting posts and a door giving access to the seat, the door having an upper portion comprising a fixed window frame fitting against one of said posts, opaque portions of the said front and sides of the vehicle forward of said driver's seat and including the said post with the adjacent portion of the door being segregated in zones which have a maximum opaque area which in transverse dimension is not greater than the normal interpupillary distance between the eyes.

4. An automotive vehicle of the closed type having a lower body section provided with a forward door opening adjacent the cowl, forward pillars rising from the cowl and offset rearwardly from the line of the jamb, a door in said lower body section overhung by one of said pillars, a window frame carried by the door having a permanently projecting upper portion fitting against said pillar, and a wind-shield fitted against said pillars, each pillar and the adjacent frame members, having collectively a maximum transverse dimension not greater than the normal interpupillary distance between the eyes.

5. An automotive vehicle of the closed type having a lower body section provided with a forward door opening adjacent the cowl, forward pillars rising from the cowl and offset rearwardly from the line of the jamb, a door in said lower body section overhung by one of said pillars, a window frame carried by the door having a permanently projecting upper portion, said pillar having a rabbet receiving said projecting portion, the pillars also having forward rabbets, and a wind-shield received in said forward rabbets, each pillar and the adjacent frame members having collectively a maximum transverse dimension not greater than the normal interpupillary distance between the eyes.

6. An automotive vehicle of the closed type having a lower body section provided with a forward door opening adjacent the cowl, a door comprising a lower section which closes said opening in the lower body section and which also provides a berth for a sliding glazing and also comprising an upper section providing a window frame to receive the glazing in raised position, the forward upright of said upper section being of markedly reduced thickness as compared with the lower body section from which it rises and of slight width fore and aft whereby it is essentially only a guide for the sliding glazing, a top-supporting corner post rising adjacent the cowl to mate with said upright and having a flange projecting behind the same against which it closes, and a wind-shield having its edge inset in the corner post, the juxtaposed opaque parts at the corner adjacent the cowl having collectively a maximum apparent transverse dimension when viewed from the driver's seat not greater than the normal interpupillary distance between the eyes.

7. A vehicle of the closed type having top-supporting corner posts, a glazed front extending between the posts, a door having an upper portion comprising a window also fitting against one of the posts, the post and adjacent contacting portions of the window and front together having a maximum opaque area which in transverse dimension is less than the normal interpupillary distance between the eyes whereby the fields of vision of the separate eyes at opposite sides of the obstruction constituted by said parts converge.

8. A vehicle of the closed type comprising top-supporting corner posts arising adjacent the cowl, doors each having an upper portion providing a frame for a sliding window, the forward uprights of said frames closing into cooperation with said posts, and a windshield; said posts having upstanding portions receiving the windshield between them and, at the rear, inwardly extending transverse webs providing a back support for the windshield, said webs having inwardly thereon rearwardly extending flanges, the uprights of the window-frames closing behind said webs and against said flanges which provide a stop therefor, the webs and flanges providing strength for the posts both in the transverse and fore and aft directions, while, by the close interspacing of the edges of the windshield and of said uprights both in transverse and fore and aft directions when the doors are closed, said posts and adjacent parts of the doors and windshield have maximum opaque areas which in transverse dimension are not greater than the normal interpupillary distance between the eyes.

In testimony whereof, I have signed my name to this specification.

WILLIAM H. EMOND.